United States Patent
Lee et al.

(10) Patent No.: US 8,812,256 B2
(45) Date of Patent: Aug. 19, 2014

(54) SYSTEM AND APPARATUS FOR MEASURING THE ACCURACY OF A BACKUP TIME SOURCE

(75) Inventors: Tony J. Lee, Pullman, WA (US); Keith C. Henriksen, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 265 days.

(21) Appl. No.: 13/005,423

(22) Filed: Jan. 12, 2011

(65) Prior Publication Data

US 2012/0179404 A1    Jul. 12, 2012

(51) Int. Cl.
*G06F 1/12* (2006.01)
*G06F 1/14* (2006.01)
*G04C 11/00* (2006.01)

(52) U.S. Cl.
USPC .............................. 702/89; 368/47; 327/292

(58) Field of Classification Search
USPC ................... 702/66, 89, 79, 125; 368/46, 47; 327/292, 296
See application file for complete search history.

(56) References Cited

U.S. PATENT DOCUMENTS

| | | |
|---|---|---|
| 3,781,706 A | 12/1973 | Osborne |
| 4,535,306 A | 8/1985 | Yamaguchi |
| 4,546,486 A | 10/1985 | Evans |
| 4,768,178 A | 8/1988 | Conklin |
| 4,808,884 A | 2/1989 | Hull |
| 5,103,466 A | 4/1992 | Bazes |
| 5,235,590 A | 8/1993 | Taguchi |
| 5,363,377 A | 11/1994 | Sharpe |
| 5,680,324 A * | 10/1997 | Schweitzer et al. .......... 370/241 |
| 5,793,869 A | 8/1998 | Claflin |
| 5,943,381 A | 8/1999 | Zampetti |
| 6,115,825 A | 9/2000 | Laforge |
| 6,236,623 B1 | 5/2001 | Read |
| 6,356,127 B1 | 3/2002 | Klipper |
| 6,456,831 B1 | 9/2002 | Tada |
| 6,567,986 B2 | 5/2003 | Ward |
| 6,577,628 B1 | 6/2003 | Hejza |
| 6,678,134 B2 | 1/2004 | Sugiura |
| 6,754,210 B1 | 6/2004 | Ofek |
| 6,847,691 B2 | 1/2005 | Torikoshi |
| 6,859,742 B2 | 2/2005 | Randall |

(Continued)

FOREIGN PATENT DOCUMENTS

| GB | 2278519 | 11/1994 |
|---|---|---|
| JP | 10247377 | 9/1998 |

(Continued)

OTHER PUBLICATIONS

Lv, Shuai et al. "An Enhanced IEEE 1588 Time synchronization for Asymmetric Communication Link in Packet Transport Network," IEEE Communications Letters, vol. 14, No. 8, Aug. 2010. pp. 764-766.*

(Continued)

*Primary Examiner* — Jonathan C Teixeira Moffat
*Assistant Examiner* — Liam R Casey
(74) *Attorney, Agent, or Firm* — Richard M. Edge (57) ABSTRACT

An intelligent electronic device incorporates a first port that accepts a time signal from a time server over a network and a second port for receiving a second time signal over a separate network. The intelligent electronic device approximates the amount of error in the second time signal based on calculations of the error in the first time signal.

17 Claims, 6 Drawing Sheets

(56) References Cited

U.S. PATENT DOCUMENTS

| | | | |
|---|---|---|---|
| 6,891,441 B2 | 5/2005 | Rochow | |
| 6,937,683 B1 | 8/2005 | Ratzel | |
| 6,947,269 B2 | 9/2005 | Lee | |
| 7,239,581 B2 | 7/2007 | Delgado | |
| 7,272,201 B2 | 9/2007 | Whitehead | |
| 7,283,568 B2 | 10/2007 | Robie | |
| 7,398,411 B2 | 7/2008 | Zweigle | |
| 7,463,467 B2 | 12/2008 | Lee | |
| 7,480,580 B2 | 1/2009 | Zweigle | |
| 7,610,175 B2* | 10/2009 | Eidson | 702/187 |
| 7,617,408 B2 | 11/2009 | Frazier | |
| 7,630,863 B2* | 12/2009 | Zweigle et al. | 702/188 |
| 7,701,683 B2 | 4/2010 | Morris | |
| 7,821,876 B2 | 10/2010 | Frantz | |
| 7,899,619 B2 | 3/2011 | Petras | |
| 8,009,519 B2 | 8/2011 | Jazra | |
| 2001/0023464 A1 | 9/2001 | Deck | |
| 2002/0069299 A1 | 6/2002 | Rosener | |
| 2004/0105341 A1* | 6/2004 | Chamberlain et al. | 367/21 |
| 2005/0069025 A1 | 3/2005 | Kimura | |
| 2006/0280182 A1* | 12/2006 | Williams et al. | 370/394 |
| 2007/0030841 A1 | 2/2007 | Lee | |
| 2007/0147415 A1* | 6/2007 | Marusca et al. | 370/465 |
| 2007/0300094 A1* | 12/2007 | Frazier et al. | 713/400 |
| 2008/0049550 A1* | 2/2008 | Fleure et al. | 367/14 |
| 2008/0071482 A1 | 3/2008 | Zweigle | |
| 2008/0097694 A1 | 4/2008 | Petras | |
| 2008/0189784 A1 | 8/2008 | Mangione-Smith | |
| 2008/0219186 A1 | 9/2008 | Bell | |
| 2008/0235355 A1 | 9/2008 | Spanier | |
| 2009/0088990 A1 | 4/2009 | Schweitzer | |
| 2009/0141727 A1 | 6/2009 | Brown | |
| 2009/0160189 A1 | 6/2009 | Rasmussen | |
| 2009/0172455 A1* | 7/2009 | Pind | 713/400 |
| 2009/0180477 A1 | 7/2009 | Akahane | |
| 2009/0216910 A1* | 8/2009 | Duchesneau | 709/250 |
| 2010/0195763 A1 | 8/2010 | Lee | |
| 2010/0254225 A1* | 10/2010 | Schweitzer et al. | 368/47 |
| 2011/0022734 A1 | 1/2011 | Etheridge | |
| 2011/0135047 A1 | 6/2011 | Tournier | |
| 2011/0185214 A1* | 7/2011 | Luskind et al. | 713/375 |

FOREIGN PATENT DOCUMENTS

| | | |
|---|---|---|
| JP | 2001221871 | 8/2001 |
| JP | 2001221874 | 8/2001 |
| WO | 0016525 | 3/2000 |
| WO | 0057527 | 9/2000 |

OTHER PUBLICATIONS

PCT/US2010/029849, Patent Cooperation Treaty International Search Report and Written Opinion of the International Searching Authority, Jul. 29, 2010.

Charles S. Carrano, Christopher T. Bridgewood, Keith M. Groves, Impacts of the Dec. 2006 Solar Radio Bursts on GPS Operations, Jan. 20, 2008.

D. Mills, Simple Network Time Protocol (SNTP) Version 4 for IPv4, IPv6, and OSI, Network Working Group Request for Comments 4330, Jan. 2006.

PCT/US2010/049169 Patent Cooperation Treaty Notification of Transmittal of the International Search Report and the Written Opinion, International Search Report, and Written Opinion, Nov. 5, 2010.

D.L. Mills, Experiments in Network Clock Synchronization, Network Working Group Request for Comments: 957, Sep. 1985.

* cited by examiner

Figure 5 test sntp

Use "CTRL-x" to terminate test mode

"T1 (relay tx)"  "T2 (server rx)"  "T3 (server tx)"  "T4 (relay rx)"  "Relay Time"  "Server Address"  "Root Delay"  "Root Dispersion"  "Reference Timestamp"  "Accuracy Error nS"  "TSOKState"

"1165D10EB306B187"  "1165D10EB3095217"  "1165D10EB30980F7"  "1165D10EB30A6736"
"1165D10EEFC584DE"  "0A64000B"  "00000025"  "1165D0988C3604DF"  "56616"  "false"

"1165D10F2C97B203"  "1165D10F2C997017"  "1165D10F2C99B27F"  "1165D10F2C9AD8DD"
"1165D10F695F11B8"  "0A64000B"  "00000025"  "1165D0988C3604DF"  "19419"  "false"

"1165D10FA63105FB"  "1165D10FA6328ADF"  "1165D10FA632C577"  "1165D10FA635A069"
"1165D10FE2F628A2"  "0A64000B"  "00000025"  "1165D0988C3604DF"  "-43783"  "true"

Figure 6 test sntp

SNTP accuracy statistics:

| | |
|---|---|
| Average Error | 0.005 |
| Min Error | 0.004 |
| Max Error | 0.054 |
| Number of SNTP updates | 4000.0 |
| Average update period in seconds | 15.5 |

Figure 7

SYSTEM AND APPARATUS FOR MEASURING THE ACCURACY OF A BACKUP TIME SOURCE

FIELD OF THE INVENTION

The present disclosures relates generally to selecting the most accurate time source of a plurality of available time sources by an Intelligent Electronic Device used in an electric power delivery system. The present disclosure also relates to systems and methods for determining the accuracy of a time source used by an Intelligent Electronic Device, and, more particularly, to a system and method of determining the accuracy of a backup time source of an Intelligent Electronic Device based on the presence of a higher accuracy primary time source.

DESCRIPTION OF THE PRIOR ART

Modern electric power delivery systems use Intelligent Electronic Devices ("IEDs") to ensure proper operation. For example, IEDs commonly monitor various power system quantities, such as voltage and current, to ensure that a given power system segment has not become faulted. When a power system segment has been faulted, the IED monitoring that segment will cause a circuit breaker or other form of switchgear to operate to isolate the faulted power system segment. When an IED makes a determination to isolate a power system segment, in some circumstances it may also send a communication to another IED to complete the isolation of the power system segment from the electric power delivery system.

Figure 2:
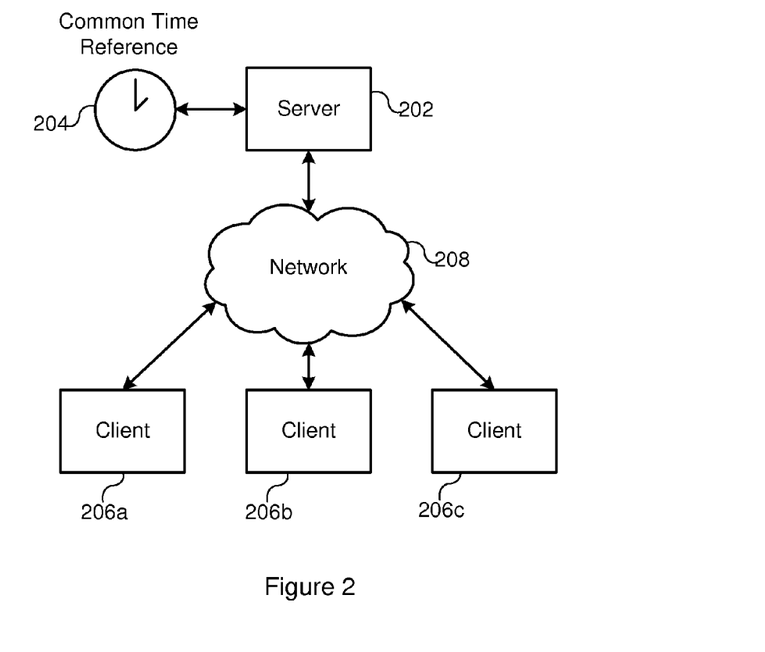
FIG. 2 is a block diagram of a typical time source distribution system as used by prior art intelligent electronic devices within a power protection system.

Certain real time data that is communicated among IEDs relies on clock synchronization between the IEDs. For example, phasor information may be passed between IEDs to assist in fault detection. Accordingly, to make productive use of such information, IEDs require a mechanism to maintain a baseline level of clock synchronization. One way that this is done is to use a common external clock source for IEDs in communication with one another. For example, a server may be connected to a time reference, such as an atomic clock or a GPS receiver, which is then distributed to a number of client IEDs, using for example, IRIG or IEEE 1588. FIG. 2 depicts a standard time distribution scheme used by power protection systems.

One issue that arises is that even if a time source is perfectly accurate, an error to the time value used by the client IED will still be introduced through unaccounted for delays between the time source and the client IED. These delays may include processing delays at the server and client, as well as messaging delays between the time source and the IED client, and the like. No time source is perfectly accurate, so this error is additive to any inherent inaccuracy in the time source, and serves as an additional source of imprecision of one IED's internal clock with respect to another IED's internal clock.

Figure 3:
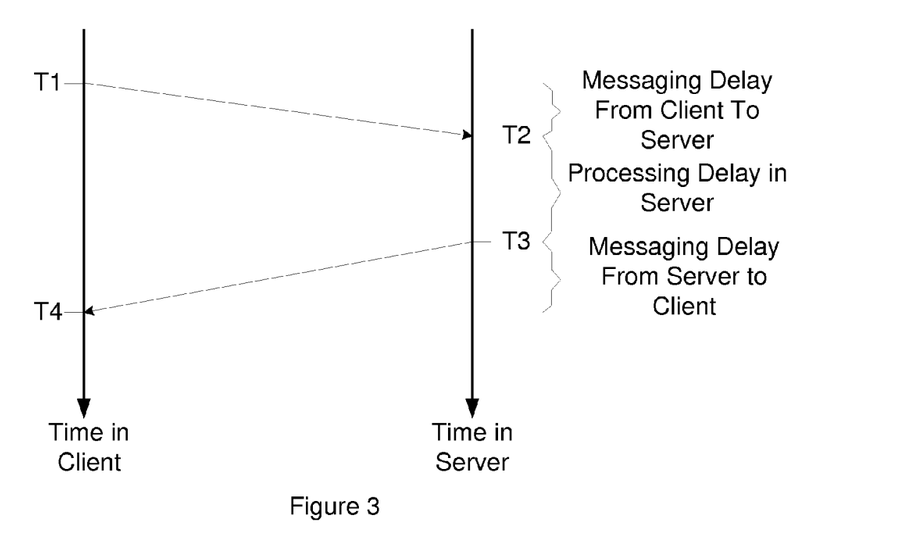
FIG. 3 is a message diagram illustrating the ping-pong method of estimating error in a network time source.

One way that such errors are addressed is through the use of the so-called "ping-pong" delay-compensation method. FIG. 3 depicts an overview of the ping pong method. As depicted, the client sends a message to the time server at T1, and stores that time as measured by the client's internal clock. The server receives the message at time T2, and stores that time, as measured by the server's internal clock. The server then processes the message from the client, and responds to the client at time T3, which is stored by the server as measured by the server's internal clock. Times T2 and T3 are communicated by the server to the client in its response, which is received by the client at time T4, and stored by the client along with times T1-T3. The client communicates these times to the server, and both calculate the offset between the client's clock and the server's clock using the formula Offset=[T2+T3−(T1+T4)]/2. The client then adjusts its internal clock using the calculated offset.

OBJECTS OF THE INVENTION

Accordingly, it is an object of this disclosure to provide for a backup time source for use by IEDs within a power protection system;

Another object of this disclosure is to provide an IED with a means to monitor the accuracy of a backup time source.

Other advantages of the disclosure will be clear to a person of ordinary skill in the art. It should be understood, however, that a system, method, or apparatus could practice the disclosure while not achieving all of the enumerated advantages, and that the protected disclosure is defined by the claims.

SUMMARY OF THE INVENTION

The disclosure achieves its objectives through an improved intelligent electronic device ("IED") for use within a power protection system. The IED incorporates a first port that accepts a time signal. In an embodiment of the disclosed IED, the time signal is received from a time server over a network. The IED also incorporates a second port for receiving a second time signal, which, in accordance with an embodiment of the disclosed IED, may be generated by a different time server disposed remotely from the IED. The second time signal incorporates a certain amount of error that is approximated by an error estimating module within the IED. In a separate embodiment of the disclosed IED, the approximated error is used when switching the IED's internal reference clock from the first time signal to the second time signal.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

DETAILED DESCRIPTION OF THE ILLUSTRATED EMBODIMENT

Figure 1:
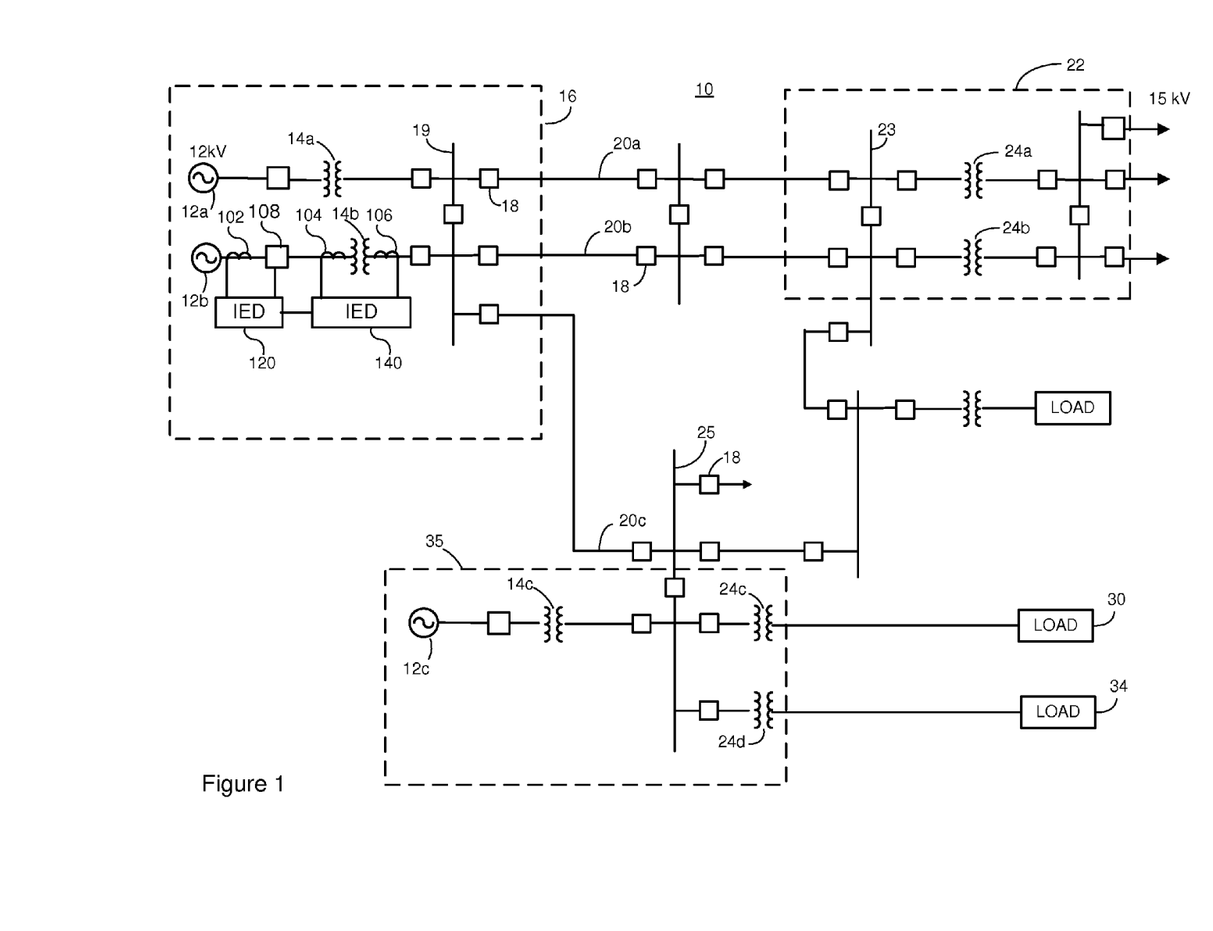
FIG. 1 is a simplified line schematic diagram of an electrical power delivery system illustrating the use of intelligent electronic devices supervising a power grid.

Turning to the Figures, and to FIG. 1 in particular, a power delivery system 10 includes, among other components, a pair of generators 12*a* and 12*b* configured to generate three-phase sinusoidal power waveforms, such as, for example, 12 kV AC waveforms. Generally, each generator will be protected by a circuit breaker; for example, generator 12*b* is protected by circuit breaker 108, which is controlled by IED 120. Also included are step up transformers 14*a* and 14*b* which are configured to increase the generated waveforms to higher voltage sinusoidal waveforms such as, for example, 138 kV AC waveforms. Generally, each step up transformer will be protected by a pair of circuit breakers; for example, step up transformer 14*b* is protected by circuit breakers, which are controlled by IED 140. The step up transformers operate to provide higher voltage waveforms to long distance transmission lines 20*a* and 20*b*. As illustrated the generators and step up transformers are part of a substation 16 and can be interconnected by a bus 19 through the operation of a circuit breaker that is depicted but not numbered.

A second substation 22 is depicted as including two step down transformers 24*a* and 24*b* that are configured to transform the higher voltage waveforms transported by the long distance transmission lines 20*a* and 20*b* to a waveform that is more suitable for distribution to a load, such as, for example, 15 kV AC. A bus 23 can interconnect different delivery lines through the operation of a circuit breaker that is depicted but not numbered.

A third substation 35 is depicted as including a third generator 12*c* as well as an additional step up transformer 14*c*, and two step down transformers 24*c* and 24*d* that connect to loads 30 and 34 respectively. A bus 25 can interconnect the third substation 35 to the rest of the power delivery system through transmission line 20*c* by operating a circuit breaker that is depicted but not numbered.

FIG. 2 depicts a widely used mechanism for distributing a time source to a plurality of clients, such as IEDs, operating within a power protection system. A time server 202 is coupled to an accurate time source 204, such as an atomic clock or a GPS receiver. The time server 202 communicates with a number of clients 206*a-c* using a network 208, which may be implemented using any network technology, wired, or wireless. The server 202 and clients 206 use an accuracy estimation, such as the ping-pong method to closely synchronize their internal clocks, so that time sensitive information can be time stamped, transported across the network and accurately used in time-sensitive computations. Systems constructed as depicted in FIG. 2 enjoy the benefits of a common time source with the improved accuracy of an offset calculated using the ping-pong method.

The disclosed system uses a second time source operatively coupled to all, or a subset of the clients. By providing a second time source, a single point of failure is removed from the system, thereby providing greater reliability to the monitored electric power delivery system. However, the introduction of a backup time source creates several problems that must be addressed. These problems and their solutions are discussed throughout this disclosure.

Figure 4:
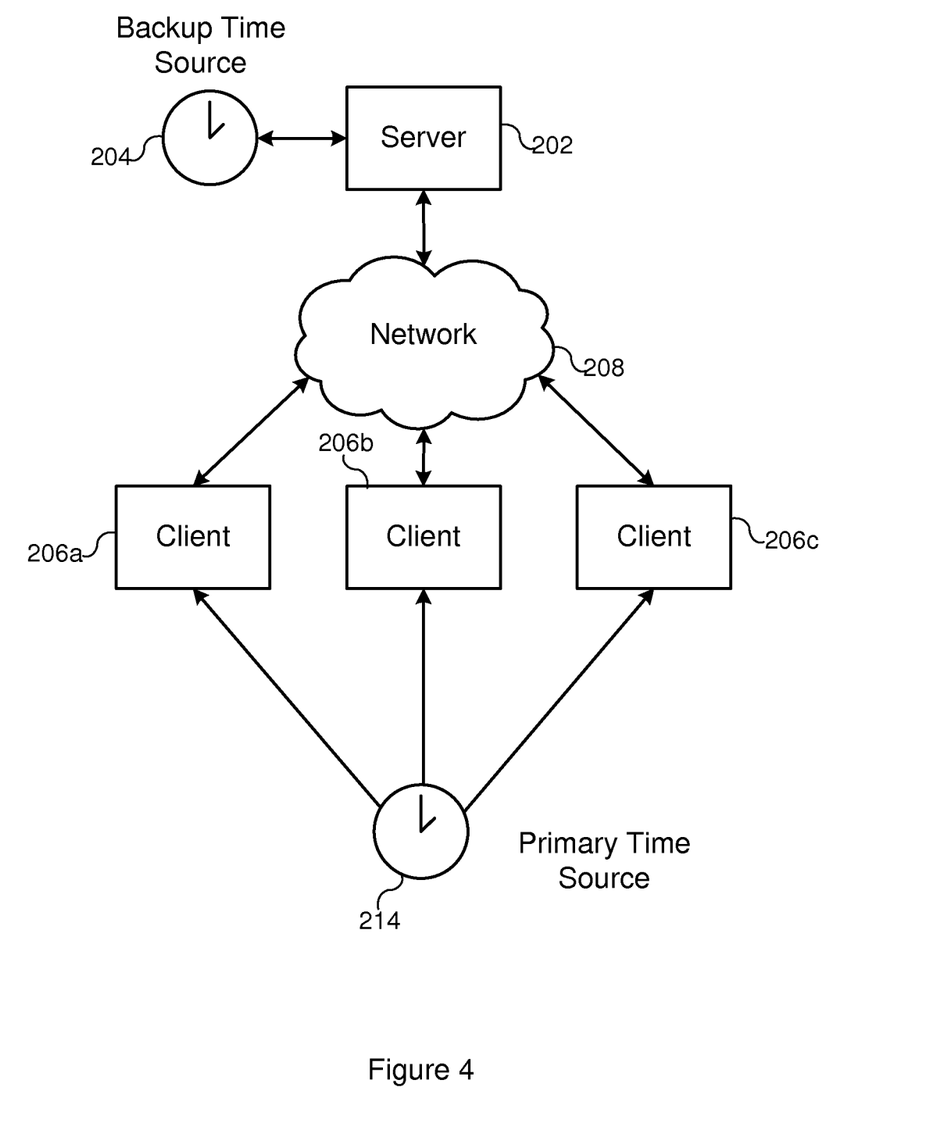
FIG. 4 is a block diagram of a time source distribution system constructed in accordance with an aspect of this disclosure.

FIG. 4 illustrates an improved power protection system utilizing a backup time source. As before, clients 206*a-c* receive time information from a primary time source 214. However, clients are also coupled through a network 208 to a time server 202. In turn, time server 202 receives time information from backup time source 204. In one embodiment, the backup time source 204 is not in communication with the clients 206*a-c* through the same network 208 as time source 214, as this may present a single point of failure in the form of network 208.

In addition to a simple absolute indication of time synchronization quality, the client can perform a statistical analysis of the offset as calculated over time relative to primary time source 214. For example, an average error can be calculated, as well as variants of this quantity, such as, for example, an average over some time period, such as 20 minutes, or 2 days, can be calculated. Furthermore, the minimum and maximum that is observed can be maintained, and displayed to users.

Various extensions of this concept can also be visualized, and are included within the boundaries of this disclosure. For example, various other baseline measurements can be calculated, such as, for example, a median (as opposed to a mean or average), or mode can be calculated, based on the monitored error signal. Furthermore, statistical quantities, such as variance/standard deviation, and the confidence interval can be calculated. All of these can be displayed to a user, or used in internal calculations.

It should be understood that while this disclosure has generally discussed an IED with a single backup time source, additional time sources are easily integrated. For example, an IED could receive external time from one of three sources, such as, for example, an IRIG feed, a communications processor, and an SNTP server. The IED would initially synchronize to the most accurate clock; i.e., in this example, the IRIG feed. If the IRIG feed was disabled, the IED would switch over to the communications processor using the methods described above, assuming the disclosed method found the communications processor to be more accurate than the SNTP server, which would be the last choice. Other or additional time sources could be integrated as well, such as an IEEE 1588 time source, or a command line time entry.

Figure 5:
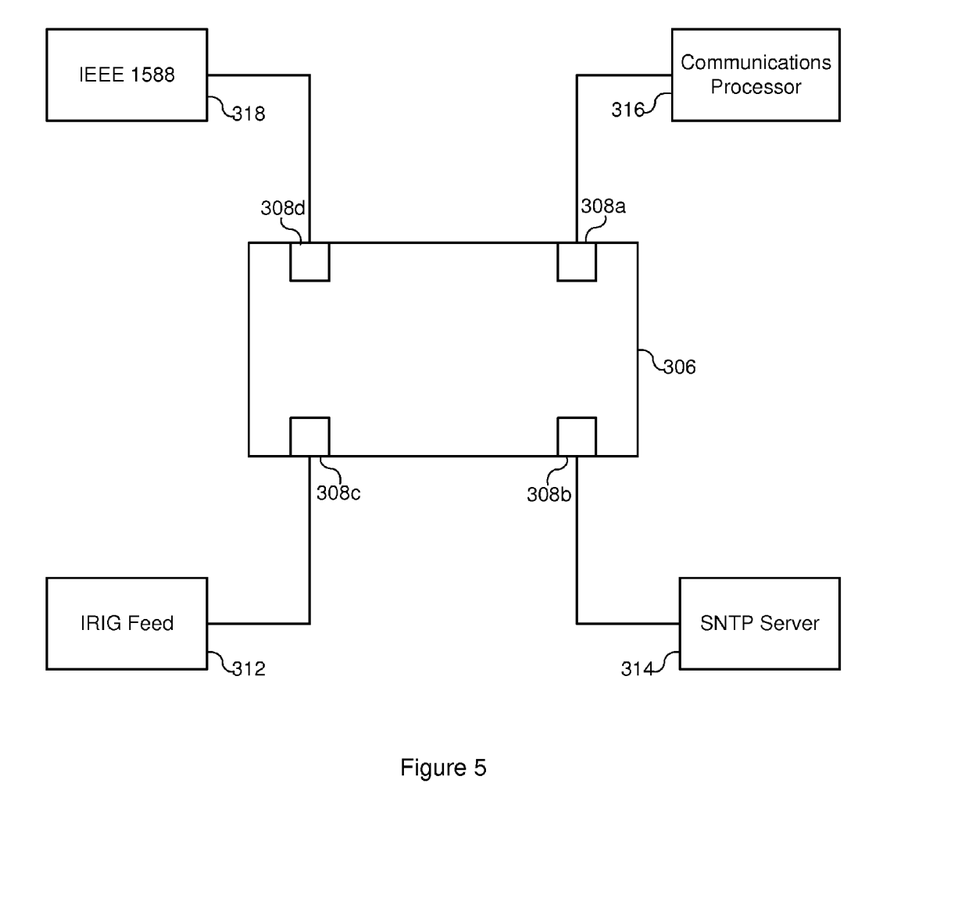
FIG. 5 is a simplified block diagram of an intelligent electronic device coupled to multiple time sources.

FIG. 5 is a simplified depiction of an IED 306 utilizing multiple time sources. The IED includes a first port 308*a* coupled to a communications processor 316, as well as a second port 308*b* coupled to a SNTP server 314, a third port 308*c* coupled to an IRIG feed 312, and a fourth port coupled to an IEEE 1588 time source. In accordance with this disclosure the IED could switch between sources with or without the disclosed error estimation adjustment.

Figure 6:
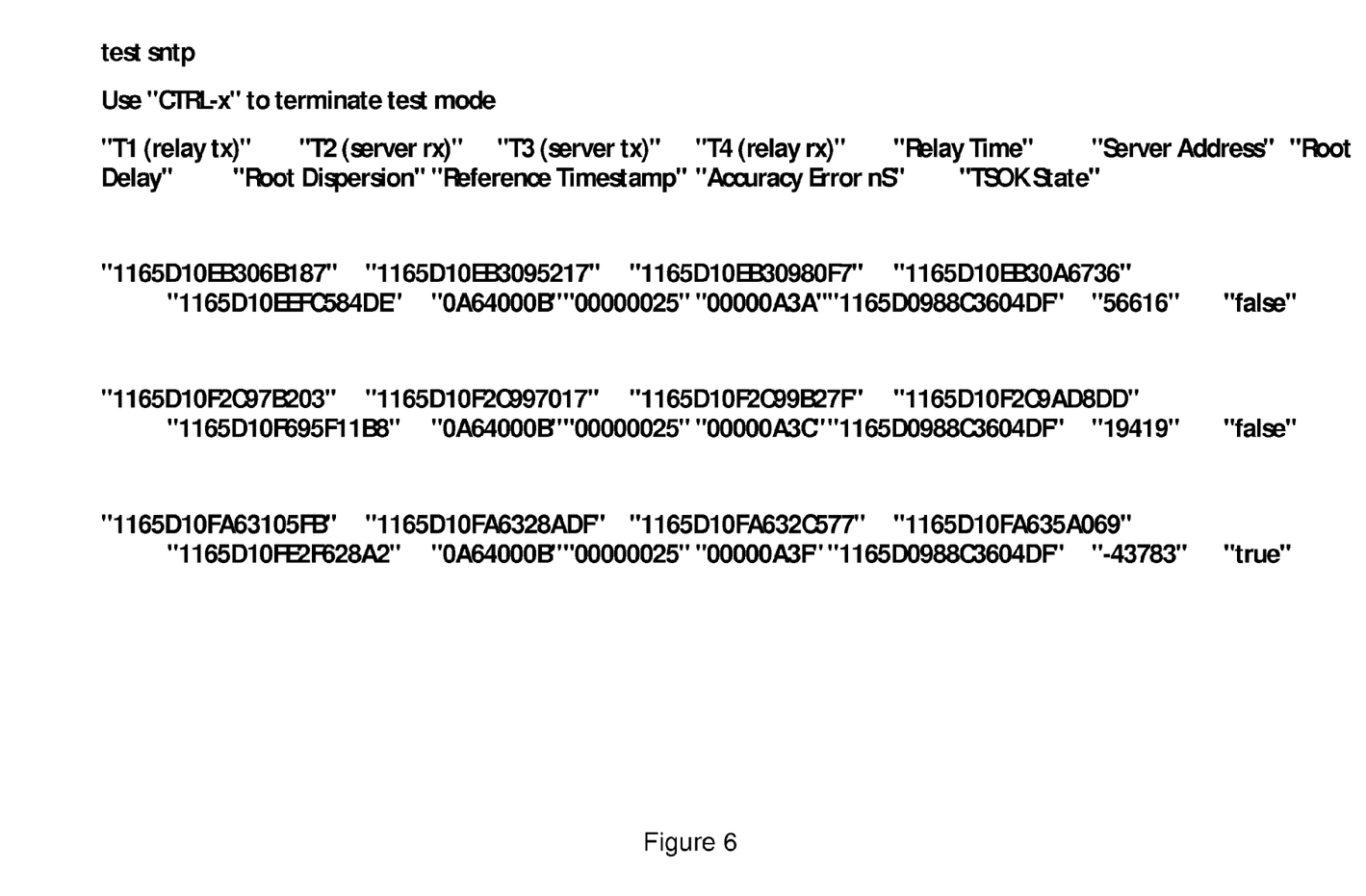
FIG. 6 is a report produced by an intelligent electronic device incorporating an accuracy measurement implemented in accordance with an aspect of this disclosure.
Figure 7:
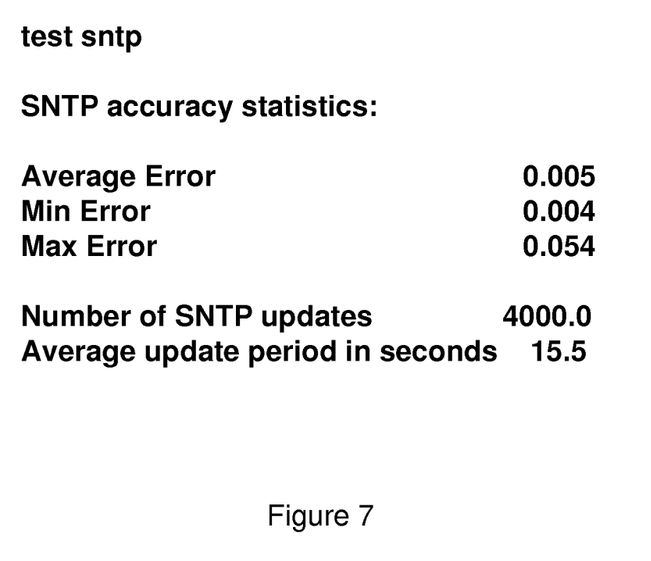
FIG. 7 is a report produced by an intelligent electronic device incorporating an accuracy measurement implemented in accordance with an aspect of this disclosure.

FIG. 6 is an example of a report that may be generated for a user displaying information including estimated error, as well as the values required by the ping-pong method. FIG. 6 is a report generated to display certain statistical quantities that are of use in judging the overall efficacy of the time synchronization. In particular, the average error over all updates, the minimum error, and the maximum error are displayed.

The foregoing description of the invention has been presented for purposes of illustration and description, and is not intended to be exhaustive or to limit the invention to the precise form disclosed. The description was selected to best explain the principles of the invention and practical application of these principles to enable others skilled in the art to best use the invention in various embodiments and various modifications as are suited to the particular use contemplated. It is intended that the scope of the invention not be limited by the specification, but be defined by the claims set forth below.

What is claimed is:

1. An intelligent electronic device for use within a power protection system comprising:
    a first port for accepting a primary time signal over a first network, the primary time signal remote from the intelligent electronic device;
    an internal clock, wherein the internal clock is initially synchronized according to the primary time signal;
    a second port for accepting a backup time signal over a second network from a time server disposed remote from the intelligent electronic device, the backup time signal not synchronized with the primary time signal and having an error relative to the primary time signal;

an error estimating module for generating an error signal approximating the error of the backup time signal relative to the primary time signal when both the primary and backup time signals are available to the intelligent electronic device, and adjusting the backup time signal using the error signal to synchronize the backup time signal with the primary time signal; and a switching component for switching synchronization of the internal clock from the primary time signal to the adjusted backup time signal when the primary time signal is not available, wherein the internal clock is synchronized according to the backup time signal taking into account the error signal.

2. The intelligent electronic device of claim 1 wherein the primary time signal is generated by an atomic clock directly connected to the first port.

3. The intelligent electronic device of claim 1, wherein the primary time signal is generated by a GPS synchronized clock directly connected to the first port.

4. The intelligent electronic device of claim 1 wherein the primary time signal is generated by a GPS receiver disposed within the intelligent electronic device.

5. The intelligent electronic device of claim 1 wherein the primary time signal is generated by a time server separate from the time server that generates the backup time signal.

6. The intelligent electronic device of claim 1 wherein the error estimating module incorporates a ping-pong calculation to generate the error signal.

7. The intelligent electronic device of claim 1 wherein the error estimating module uses the primary time signal to generate the error signal.

8. A system for estimating an error within a backup time source used by one or more intelligent electronic devices within a power protection system, the system comprising:

at least one intelligent electronic device, the at least one intelligent electronic device having an internal clock;

a first time source remote from the at least one intelligent electronic device, coupled to the at least one intelligent electronic device over a first network, the first time source producing a first time signal, wherein the internal clock of the at least one intelligent electronic device is initially synchronized according to the first time signal;

a second time source not synchronized with the first time source, coupled to the at least one intelligent electronic device over a second network, the second source comprising a time server producing a second time signal, the second time signal having an error relative to the first time signal;

an error estimating module coupled to the at least one intelligent electronic device, the error estimating module generating an error signal approximating the error of the second time signal when both the primary and backup time sources are available to the at least one intelligent electronic device; and a switching component for switching synchronization of the internal clock from the first time signal to the second time signal when the first time signal is not available to the at least one intelligent electronic device, wherein the internal clock is synchronized according to the second time signal taking into account the error signal, such that the second time signal is synchronized to the first time signal and the error of the second time signal is not incorporated into the synchronized internal clock.

9. The system of claim 8 wherein the first time source is an atomic clock.

10. The system of claim 8 wherein the first time source is a GPS receiver.

11. The system of claim 8 wherein the first time source is a time server separate from the time server producing the second time signal.

12. The system of claim 8 wherein the error estimating module further comprises a ping pong calculation to generate the error signal.

13. The system of claim 8 wherein the error estimating module uses the first time signal to generate the error signal.

14. An intelligent electronic device for use within a power protection system comprising:

a first port for accepting a first time signal over a first network, the first time signal remote from the intelligent electronic device;

a second port for accepting a second time signal over a second network, the second time signal remote from the intelligent electronic device and not synchronized with the first time signal;

a third port for accepting a third time signal remote from the intelligent electronic device and not synchronized with the first or second time signals;

a time source availability monitor for determining availability of the first, second, and third time signals;

a processor for selecting a time signal from the first, second, and third time signals to use as an active time signal, wherein the processor selects the active time signal based on which time signal is most accurate;

an internal clock, wherein the internal clock is synchronized according to the active time signal; and an error estimating module for determining an error of the remaining time signals relative to the active time signal while the active time signal is available, and synchronizing the remaining time signals to the active time signal using the error signal, wherein, in response to the time source availability monitor determining that the active time source is not available, the internal time clock is synchronized according to one of the remaining time signals taking into account the error.

15. The intelligent electronic device of claim 14 wherein the first time signal is sourced from an IRIG feed, the second time signal is sourced from a communications processor, and the third time signal is sourced from an SNTP server.

16. The intelligent electronic device of claim 14 wherein one of said time signals is sourced from an IEEE 1588 time source.

17. A power protection system comprising:

a plurality of intelligent electronic devices, each receiving a primary time signal from a primary time source remote from the plurality of intelligent electronic devices using a first network;

a backup time server receiving a backup time signal from a backup time source remote from the plurality of intelligent electronic devices and not synchronized with the primary time signal, the backup time server in communication with the plurality of intelligent electronic devices using a second network;

wherein each intelligent electronic device of the plurality of intelligent electronic devices comprises an internal clock, wherein the internal clocks are initially synchronized to the primary time signal;

an error estimating module for generating an error signal approximating an error of the backup time signal relative to the primary time signal while the primary time signal is available, and generating an adjusted backup time signal using the error and the backup time signal; and a switching component for switching synchronization of the internal clocks from the primary time signal to the adjusted backup time signal when the primary time signal becomes unavailable.

* * * * *